(12) United States Patent
Rachel et al.

(10) Patent No.: US 6,957,929 B1
(45) Date of Patent: Oct. 25, 2005

(54) SINGLE AND DUAL REEL FLYING LEAD DEPLOYMENT APPARATUS

(75) Inventors: Willie Dee Rachel, Houston, TX (US); Michael Shane Fields, Houston, TX (US); Richard D. Haun, Katy, TX (US)

(73) Assignee: Kvaerner Oilfield Products, Inc., Houston, TX (US)

( * ) Notice: Subject to any disclaimer, the term of this patent is extended or adjusted under 35 U.S.C. 154(b) by 50 days.

(21) Appl. No.: 10/770,100

(22) Filed: Feb. 2, 2004

(51) Int. Cl.[7] ............................ F16L 1/14; B63B 35/04
(52) U.S. Cl. .................. 405/158; 405/190; 405/168.3; 405/169; 254/276; 254/366; 242/390; 242/396.5
(58) Field of Search ............................ 405/154.1, 158, 405/166, 168.3, 169, 170, 190; 254/276, 254/342, 355, 366; 242/390, 396.5, 376.6, 242/397, 397.1, 397.2

(56) References Cited

U.S. PATENT DOCUMENTS

| | | | |
|---|---|---|---|
| 6,223,675 B1 * | 5/2001 | Watt et al. ................... | 405/190 |
| 6,588,980 B2 * | 7/2003 | Worman et al. ............. | 405/158 |
| 6,776,559 B1 * | 8/2004 | Peterson ...................... | 405/158 |
| 6,796,261 B2 * | 9/2004 | Colyer ......................... | 114/258 |

* cited by examiner

Primary Examiner—Frederick L. Lagman
(74) Attorney, Agent, or Firm—Buskop Law Group, P.C.; Wendy Buskop

(57) ABSTRACT

The flying lead deployment apparatus with one reel assembly is made of a frame assembly; a reel assembly with flying lead disposed in the frame assembly adapted to rotate to distribute the flying lead; a first ROV-flying lead interface connected to the frame assembly and one end of the flying lead; a second ROV-flying lead interface connected to the reel assembly and the other end of the flying end; a drive assembly connected to the reel assembly with a counting gear adapted to count the number of times the reel assembly rotates, an adjustable rack gear, and a locking mechanism connected to the adjustable rack gear and the reel assembly adapted to stop the reel assembly when the counting gear reaches a predetermined number; and a friction brake connected to the frame assembly and reel assembly adapted to apply friction to maintain constant tension on the flying lead.

20 Claims, 7 Drawing Sheets

SINGLE AND DUAL REEL FLYING LEAD DEPLOYMENT APPARATUS

FIELD

The apparatus herein is capable of deploying 500 feet of flying leads on single or dual reels. The apparatus is adjustable to stop automatically for varying lengths of flying lead due to a counting gear, an adjustable rack gear, and braking mechanism.

Methods relate to the use of the single and dual reel flying lead deployment apparatus.

BACKGROUND

The conventional method of controlling subsea tree functions has been through a connection method from a remote hydraulic or electrical/hydraulic source acting via a control or umbilical line and an interface plate(s). These interface plates have been disconnected and reconnected in various ways to switch remote operation from a production (or "host") facility to a vessel overhead during equipment installation and later workover (well intervention). The key to the interfaces is that when in the workover mode, the production mode of operation is locked out, thereby preventing accidental operation by outside sources when critical control of the well is required by the overhead vessel.

The problem in the current art is the installation of the umbilical lines or flying leads in a swift and economical manner.

Typically, flying leads have been installed using a vessel. The length of required flying lead is lowered from a vessel to the sea floor. The ends of the flying lead are picked up by remote operated vehicles and connected at the corresponding trees or junctions. This method requires a vessel to be present the entire time of the install thereby increasing the cost of the project (rent of the vessel plus the crew and the associated costs).

In addition, since the flying leads are often being lowered from a vessel to a seabed at great depths, the risk factor to workers and equipment is increased.

A need exists for an apparatus that can be deployed on a seabed and then deploy a predetermined length of flying lead without the need of a vessel to be present.

SUMMARY

The flying lead deployment apparatus with one reel assembly is made of a frame assembly that houses a reel assembly. The reel assembly allows flying lead to be wound around the reel and rotates to distribute the flying lead. A first ROV-flying lead interface is connected to the frame assembly and one end of the flying lead and a second ROV-flying lead interface is connected to the reel assembly and the other end of the flying lead. A friction brake is connected to the reel assembly to apply friction to the reel in order to maintain a constant tension on the flying lead.

A drive assembly connected to the frame and the reel comprises a counting gear adapted to count the number of times the reel assembly rotates; an adjustable rack gear; and a locking mechanism connected to the adjustable rack gear. The locking mechanism is adapted to stop the reel assembly when the counting gear reaches a predetermined number.

The dual flying lead deployment apparatus has two reel assemblies located within one frame assembly. Each reel assembly has a friction brake and a drive assembly. The two reel assemblies rotate separately from one another. Each reel can be set to distribute varying lengths of flying lead.

An embodiment herein is a method for using a single reel flying lead deployment apparatus to distribute a predetermined length of flying lead using a remote operated vehicle (ROV). The method can also be used for a dual reel flying lead deployment apparatus.

BRIEF DESCRIPTION OF THE DRAWINGS

The detailed description will be better understood in conjunction with the accompanying drawings, wherein like reference characters represent like elements, as follows.

The present apparatus is detailed below with reference to the listed Figures.

DETAILED DESCRIPTION OF THE PREFERRED EMBODIMENTS

Before explaining the present apparatus in detail, it is to be understood that the apparatus is not limited to the particular embodiments and that it can be practiced or carried out in various ways.

The flying lead deployment apparatus is a single reel or multiple reel assembly that is adapted to deploy up to 500 feet of flying lead. The apparatus can be operated from the deck of a vessel or placed on the seabed. Both embodiments use existing reel designs and allow existing reel assemblies to placed into a frame assembly with only minor modifications.

The flying lead deployment apparatus includes a drive assembly that stops the reel assembly when a predetermined length of flying lead has been deployed.

The flying lead deployment apparatus permits a vessel to deploy the apparatus on the seabed and gather the apparatus at a later date.

The subsea reel deployment system also provides novel remote operated vehicle (ROV) access features in alterative embodiments.

Figure 1:
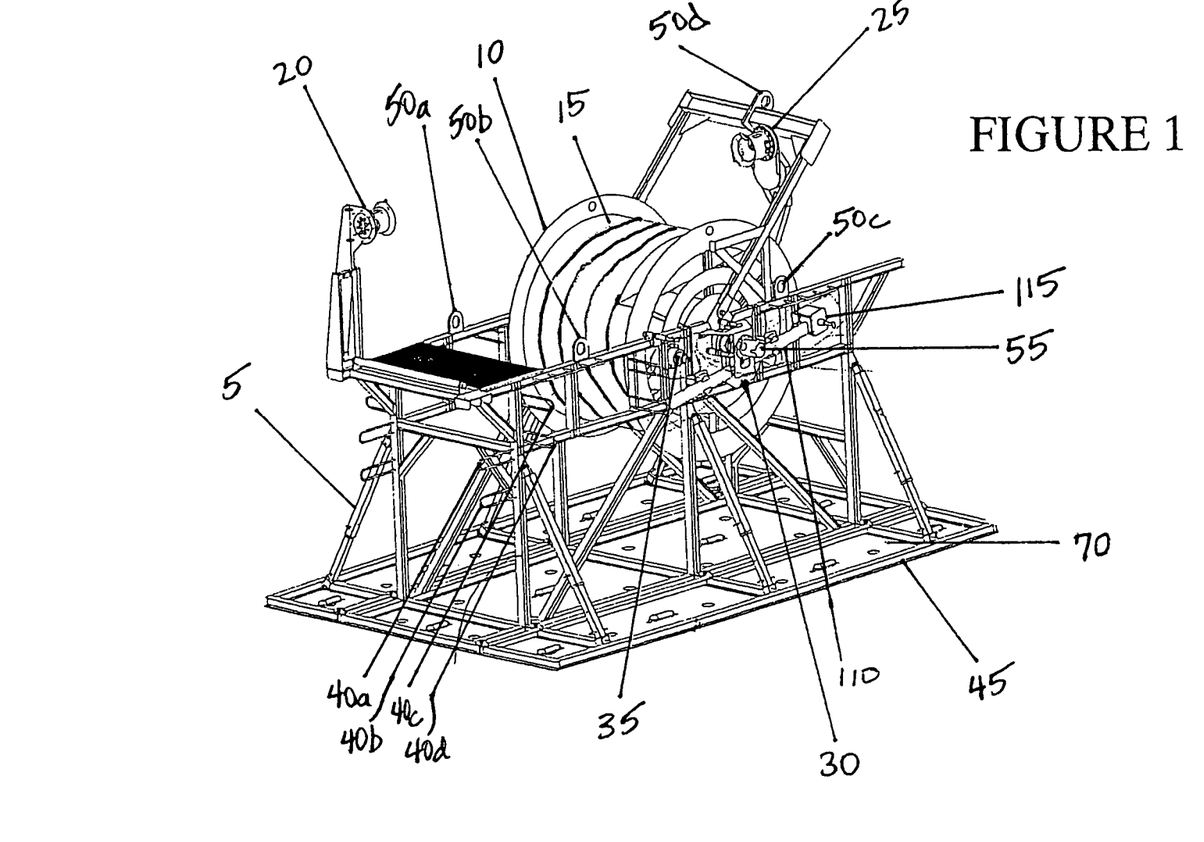
FIG. 1 depicts a perspective view of a flying lead deployment apparatus with a single reel assembly.
Figure 2:
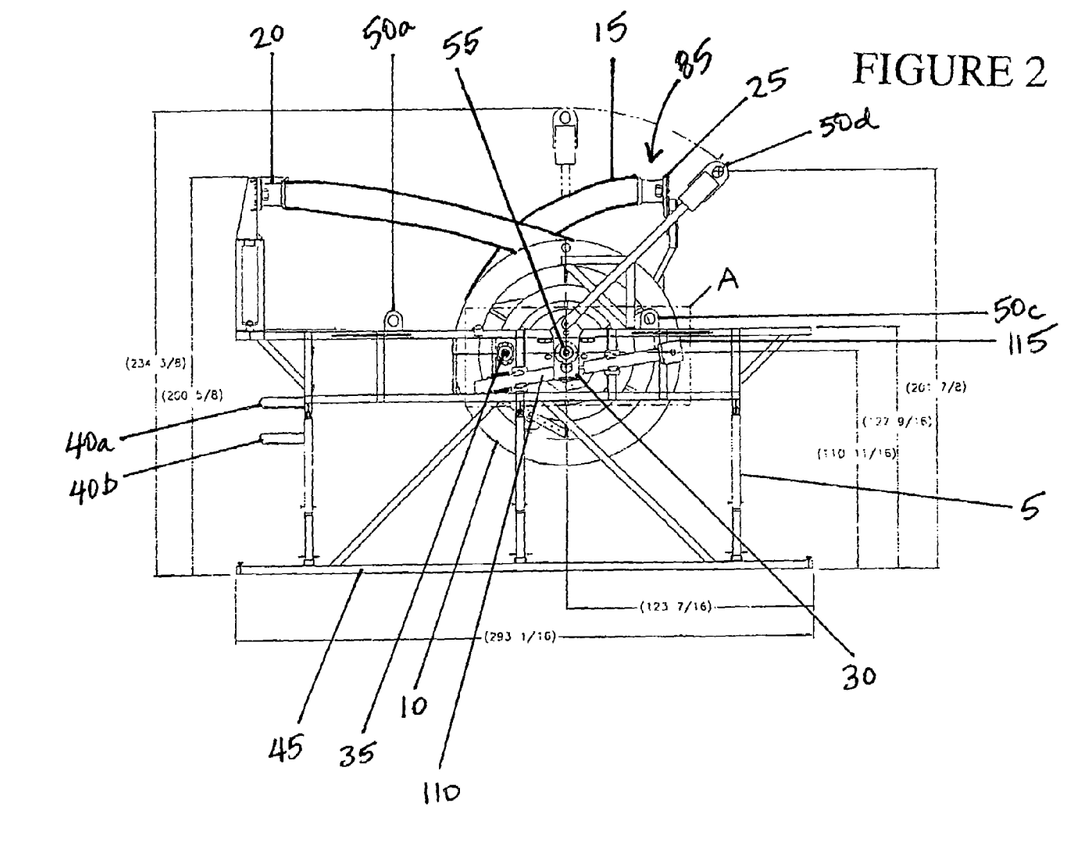
FIG. 2 depicts a side view of a flying lead deployment apparatus with a single reel assembly.

With reference to the Figures, FIG. 1 depicts a perspective view of a flying lead deployment apparatus with a single reel assembly. FIG. 2 depicts a side view of a flying lead deployment apparatus with a single reel assembly.

Referring to FIG. 1 and FIG. 2, the flying lead deployment apparatus with one reel assembly has a frame assembly (5) to house and support the elements of the apparatus. The frame assembly has a base frame (45) that gives support to the flying lead deployment apparatus while the apparatus is positioned on the seabed or the deck of a vessel. The base frame (45) needs to be broad enough and sturdy enough to prevent the flying lead deployment apparatus from tipping during transport and operation. The base frame (45) can include a mud mat (70) to aid in creating a stable base for the apparatus.

The frame assembly includes numerous lifting eyes (50a, 50b, 50c, and 50d) to aid in the lifting of the flying lead deployment apparatus. Folding wings (60 and 65) can also be added to the frame assembly (5). The folding wings (60 and 65) are folded onto the frame assembly (5) during transport and storage to make the apparatus smaller and easier to transport. When the apparatus is deployed on the seabed for use, the folding wings are "unfolded" to increase the area of the base frame (45).

FIG. 2 depicts an example set of dimensions for the frame assembly (5) with base frame (45). The flying lead deployment apparatus can be constructed in a wide range of sizes depending upon the need of a given project.

Figure 3:
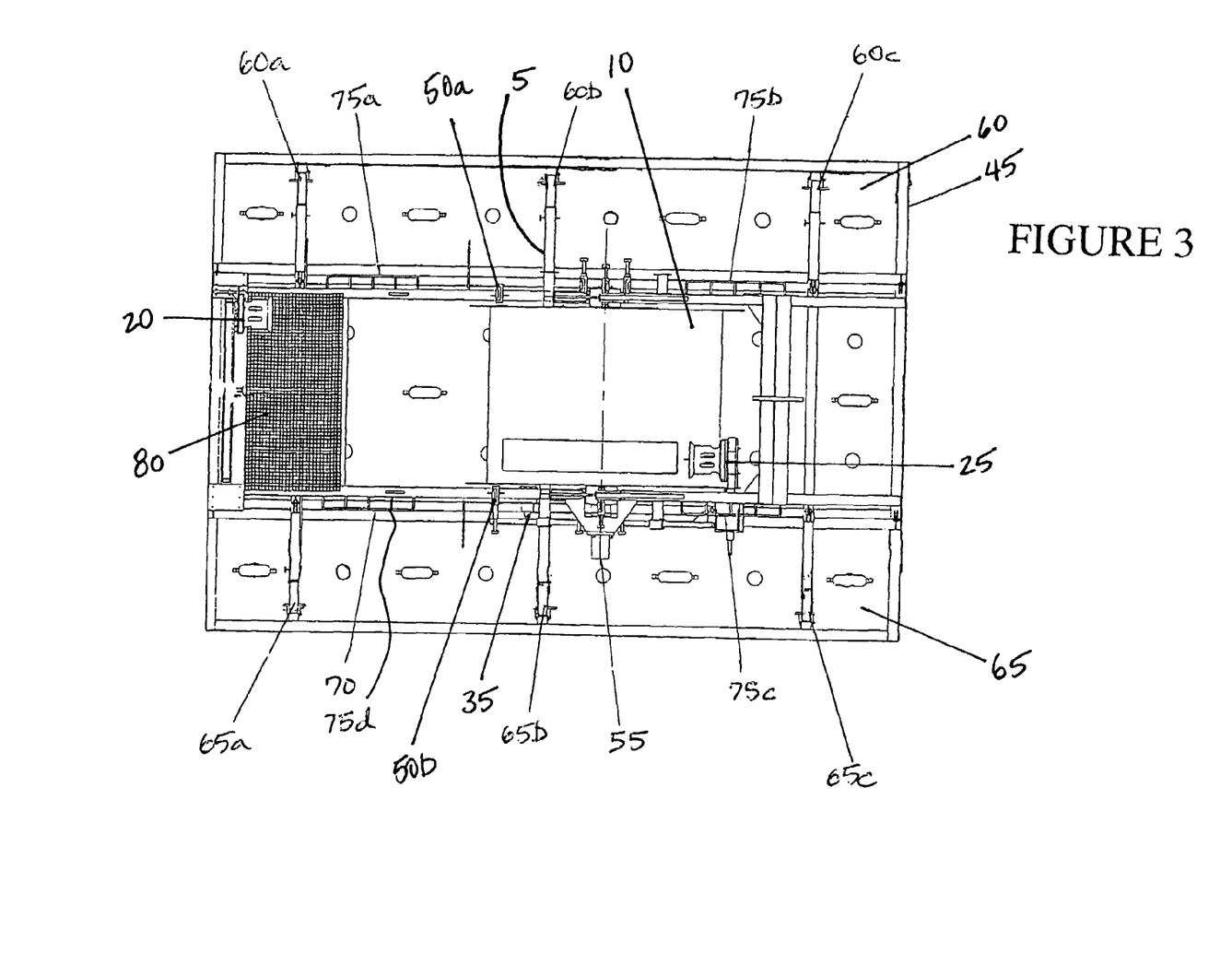
FIG. 3 depicts a plain view of a flying lead deployment apparatus with a single reel assembly.

As shown in FIG. 3, each folding wing (60 and 65) can include at least three locking devices (60a, 60b, 60c, 65a, 65b, and 65c). The locking devices (60a, 60b, 60c, 65a, 65b, and 65c) lock the folding wings (60 and 65) in place. Even though FIG. 3 depicts three locking devices per folding wing (60 and 65), an embodiment contemplates that only one locking device is required per folding wing to keep the folding wing in the "folded" position during transport and storage. The folding wings (60 and 65) can be considered as extensions for the mud mat (70). The mud mat (70) and the folding wings (60 and 65) also ensure that the apparatus will not sink too far into the seabed in loose soil conditions.

The frame assembly (5) can include a catwalk (80), as shown in FIG. 3, and equipment baskets (not shown) to facilitate movement around the frame assembly (5). Since the flying lead deployment apparatus is deployed on the seabed to deploy the flying lead, the frame assembly (5) can include corrosion protection devices to increase the lifespan of the flying lead deployment apparatus.

As seen in FIG. 3, the frame assembly (5) can include numerous ROV grab handles (75a, 75b, 75c, and 75d). The grab handles (75a, 75b, 75c, and 75d) are connected to the side of the frame assembly (5) to allow an ROV to stabilize the vehicle before interfacing with the apparatus. The ROV grab handles are usually welded steel orientated to match the grabbing mechanism of the ROV. FIG. 3 depicts four ROV grab handles as a preferred embodiment. The frame assembly (5) can include one or more ROV grab handles depending upon the size of the apparatus.

Returning to FIG. 1 and FIG. 2, the flying lead deployment apparatus has at least on reel assembly (10) supported by the frame assembly (5). The reel assembly (10) allows the flying lead (15) to be spooled around reel assembly (10). The reel assembly (10) is adapted to rotate to distribute the flying lead (15) as the flying lead (15) is pulled from the reel assembly (10) by a remote operated vehicle (ROV).

The frame assembly (5) can also include numerous saddles (40a, 40b, 40c, and 40d) attached to the frame assembly (5). The saddles are adapted to hold electrical flying leads. The addition of the saddles allows the flying lead deployment apparatus to have multiple uses. The flying lead deployment apparatus can now deploy hydraulic flying leads from the reel assembly and electric flying leads from the saddles.

The flying lead deployment apparatus allows conventional reel assemblies to be used. The use of conventional reel assemblies saves cost since the reel assemblies commonly used in the field can be easily adapted for use in the apparatus. Conventional reel assemblies include a rotatable drum mounted on a shaft connected to a drive assembly. The flying lead, either hydraulic or electrical, is spooled around the rotatable drum. An indexing plate is connected to the rotatable drum and a lifting yoke is connected to the indexing plate. A counterweight assembly is mounted within the rotatable drum to stabilize the rotation of the rotatable drum. Conventional reel assemblies (10) are easily adapted to connect to the drive assembly described herein to halt the reel when a predetermined length of flying lead has been removed.

Continuing with FIG. 1 and FIG. 2, the flying lead deployment apparatus has a first ROV-flying lead interface (20) connected to the frame assembly (5) and one end of the flying lead (15). The first ROV-flying lead interface (20) allows the ROV to connect to the flying lead (15) in order to pull the flying lead (15) from the reel assembly (10).

As the ROV removes the flying lead (15) from the reel assembly (10), the reel assembly (10) rotates. A friction brake (35) connected to the frame assembly (5) and the reel assembly (10) applies friction to the reel assembly (10) in order to maintain a constant rate of deployment. The friction brake (35) ensures that a constant tension is kept on the flying reel (15) as the flying reel (15) is deployed. The friction brake (35) also prevents "over-spooling".

The flying lead deployment apparatus has a second ROV-flying lead interface (25) connected to the reel assembly (10) and the other end of the flying lead (15). Once a predetermined length of flying lead (15) has been pulled from reel assembly (10), the ROV detaches from the flying lead, returns to the flying lead deployment apparatus, and connects with the second ROV-flying lead interface (25). The second ROV-flying lead interface (25) allows the ROV to connect to the flying lead (15) in order to remove the flying lead (15) entirely from the apparatus. The ROV can then position the flying lead (15) on the seabed and prepare the flying lead to connect with other subsea connections.

In the preferred embodiment, the ROV-flying lead interfaces (20 and 25) are non-moveable J-plates adapted to allow an ROV to dock with the interface. The ROV-flying lead interfaces (20 and 25) can be constructed of other materials as long as the materials are sturdy enough to allow the connection between the ROV and the flying lead. The material needs to be sturdy enough to endure extreme and harsh subsea conditions.

Continuing with FIG. 1 and FIG. 2, the flying lead deployment apparatus uses a drive assembly (30) to control the reel assembly (10) in order to ensure that only the predetermined length of flying lead (15) is deployed. The drive assembly (30) includes a counting gear, an adjustable rack gear (110), and a locking mechanism (115).

Figure 4:
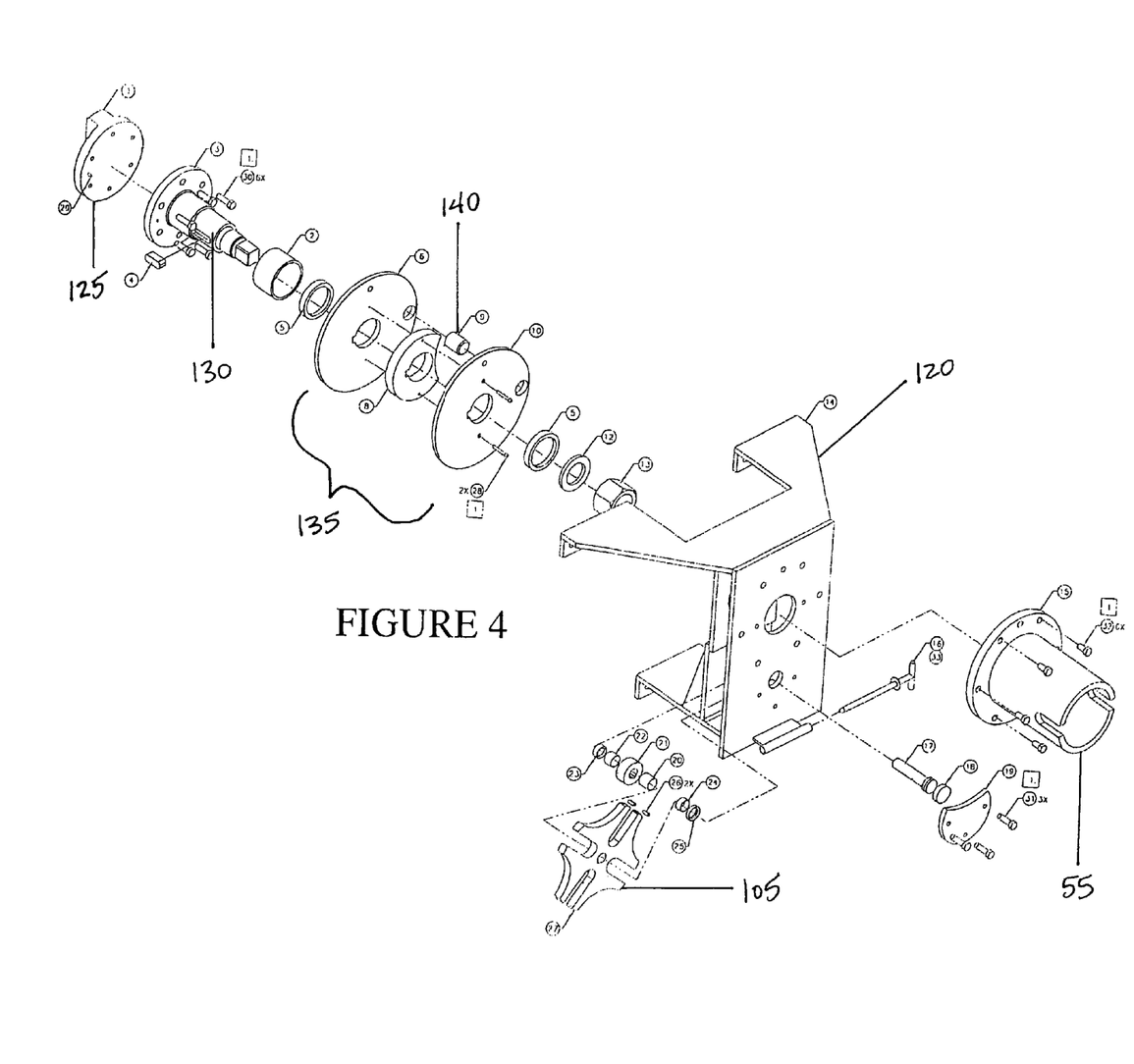
FIG. 4 depicts an exploded perspective view of the drive assembly without the adjustable rack gear.

FIG. 4 depicts an exploded perspective view of the drive assembly (30) without the adjustable rack gear (110) and the locking mechanism (115). The drive assembly (30) is connected to the reel assembly (10) by a drive plate (125). As the ROV removes the flying lead (15) from the reel assembly (10), the reel assembly (10) rotates, thereby, turning the drive plate (125) and the connected drive shaft (130).

As seen in FIG. 4, the drive shaft (130) turns the drive shaft plate assembly (135). The drive shaft plate assembly (135) includes a drive stop (140). The drive stop (140) interfaces with the counting gear (105). The counting gear (140), therefore, "counts" the number rotations of the reel assembly (10). The counting gear (140) can be in a variety of gear ratios with a preferred gear ratio of 4:1. The drive assembly parts are enclosed in a drive assembly housing (120).

Figure 5:
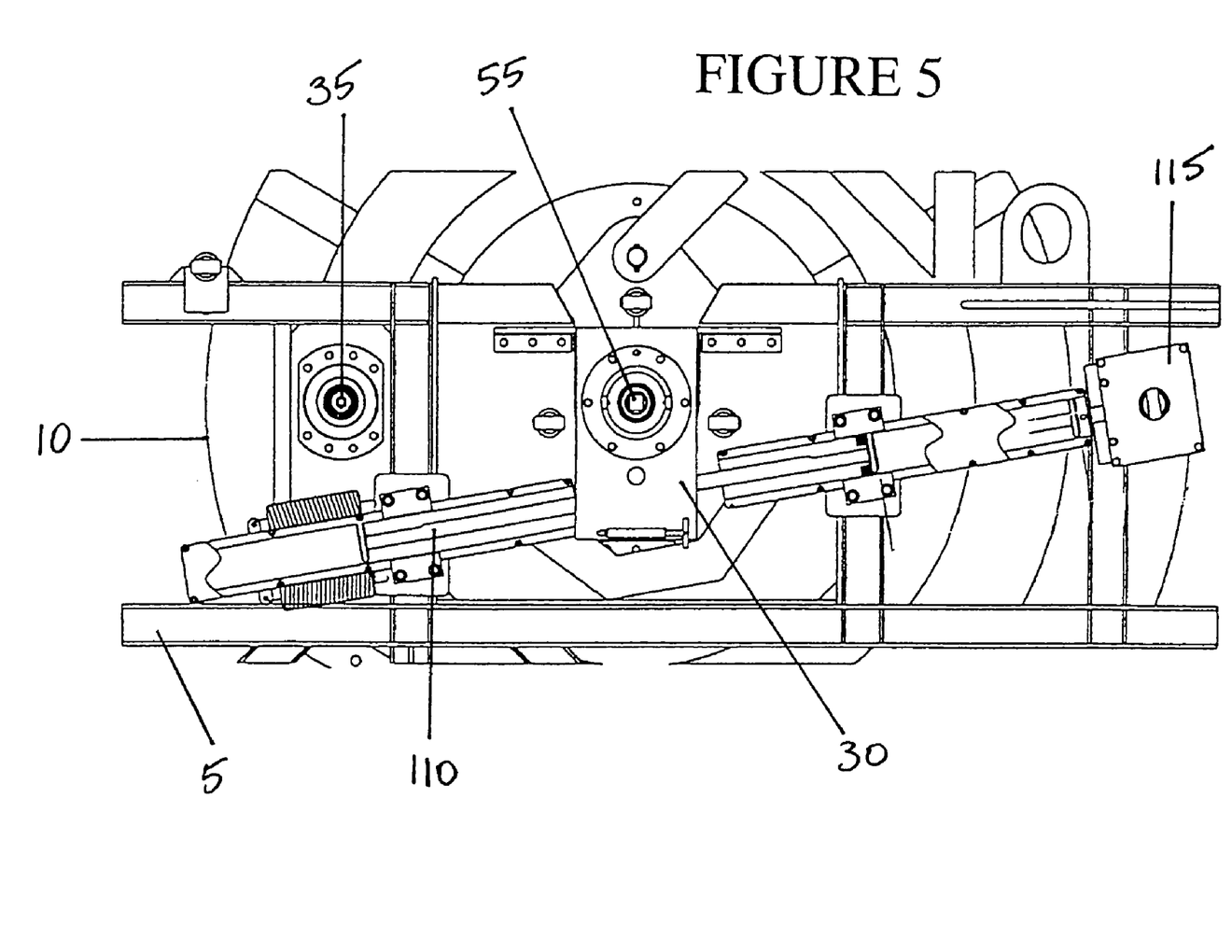
FIG. 5 depicts a detailed side view of the drive assembly with adjustable rack gear and locking mechanism.

FIG. 5 depicts a detailed side view of the drive assembly with adjustable rack gear (110) and locking mechanism (115). FIG. 5 is detailed view "A" from FIG. 2. The counting gear (105) is connected to an adjustable rack gear (110). The connection location of the counting gear (105) and the adjustable rack gear (110) is based upon the calculation associated with the predetermined length of flying lead (15).

Before the apparatus is used, the adjustable rack gear (110) is manually positioned so that when the counting gear (105) reaches a predetermined number the adjustable rack gear (110) rack gear engages the locking mechanism (115). The position of the adjustable rack gear (110) is determined upon a calculation of a number of factors. Example of factors used in the calculation to set the position of the adjustable rack gear (110) include the length of flying lead to be deployed, the gear ratio of the counting gear, the diameter of the reel assembly, and others.

As an example, the user determines the number of rotations of the reel assembly required to deploy a predetermined length of flying lead based upon the diameter of the reel assembly. The user then determines the associated number of rotations required by the counting gear to equal that number of rotations of the reel assembly based upon the counting gear ratio. The adjustable rack gear is then set accordingly so that the locking mechanism is engaged when the correct length of flying lead is deployed.

The adjustable rack gear (110) allows the same apparatus to be used for varying length of flying lead (15). The adjustable rack gear (110) converts the rotational energy of the reel assembly (10) to linear motion to engage the locking mechanism (115).

The locking mechanism (115) is connected to the adjustable rack gear (110) and the reel assembly (10). The locking mechanism (115) stops the reel assembly (10) when the counting gear (105) reaches the predetermined number, thereby; signifying a predetermined length of flying lead (15) has been deployed. The locking mechanism (115) also stops the reel assembly (10) so that the second ROV-flying lead interface (25) is in a "twelve o-clock" position (85), as shown in FIG. 2. With the second ROV-flying lead interface (25) in a "twelve o-clock" position (85), the ROV can easily interface with the apparatus and connect to the other end of the flying lead (15).

The drive assembly (30) can further include an ROV-reel assembly interface (55). If a malfunction occurs or if another reason arises that the ROV is required to rotate the reel assembly (10) to deploy the flying lead (15), the ROV-reel assembly interface (55) is adapted to allow the ROV to drive the reel assembly (10).

Figure 6:
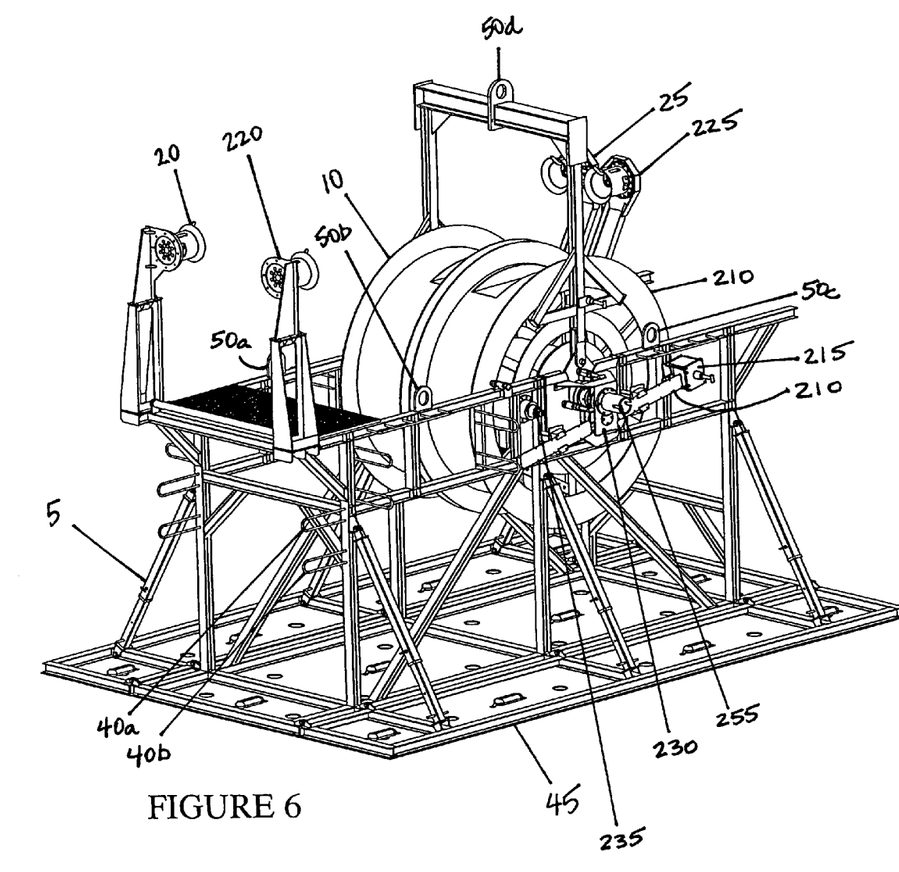
FIG. 6 depicts a perspective view of a flying lead deployment apparatus with two reel assemblies.

Another embodiment is a dual reel flying lead deployment apparatus. FIG. 6 depicts a perspective view of a flying lead deployment apparatus with two (or dual) reel assemblies. The dual reel flying lead deployment apparatus includes two reel assemblies (10 and 210) on a single frame assembly (5). Each reel assembly (10 and 210) includes a separate friction brake (235) and a separate drive assembly (230) with a separate counting gear (see FIG. 4), a separate adjustable rack gear (210), and a separate locking mechanism (215). Each reel assembly also includes two separate ROV-flying lead interfaces (20, 25, 220, and 225). Each reel assembly (10 and 210) rotates freely and acts independently of the other reel assembly.

The drive assembly (30) can further include an ROV-reel assembly interface (55). If a malfunction occurs or if another reason arises that the ROV is required to rotate the reel assembly (10) to deploy the flying lead (15), the ROV-reel assembly interface (55) is adapted to allow the ROV to drive the reel assembly (10). As part of the dual reel flying lead deployment apparatus, each drive assembly (230) can have a separate ROV-reel assembly interface (255).

An embodiment is a method for using a multiuse adjustable flying lead deployment system. The method is shown as a schematic in FIG. 7. The method begins by placing the flying lead deployment apparatus, either single or dual reel, on a seabed (705).

Figure 7:
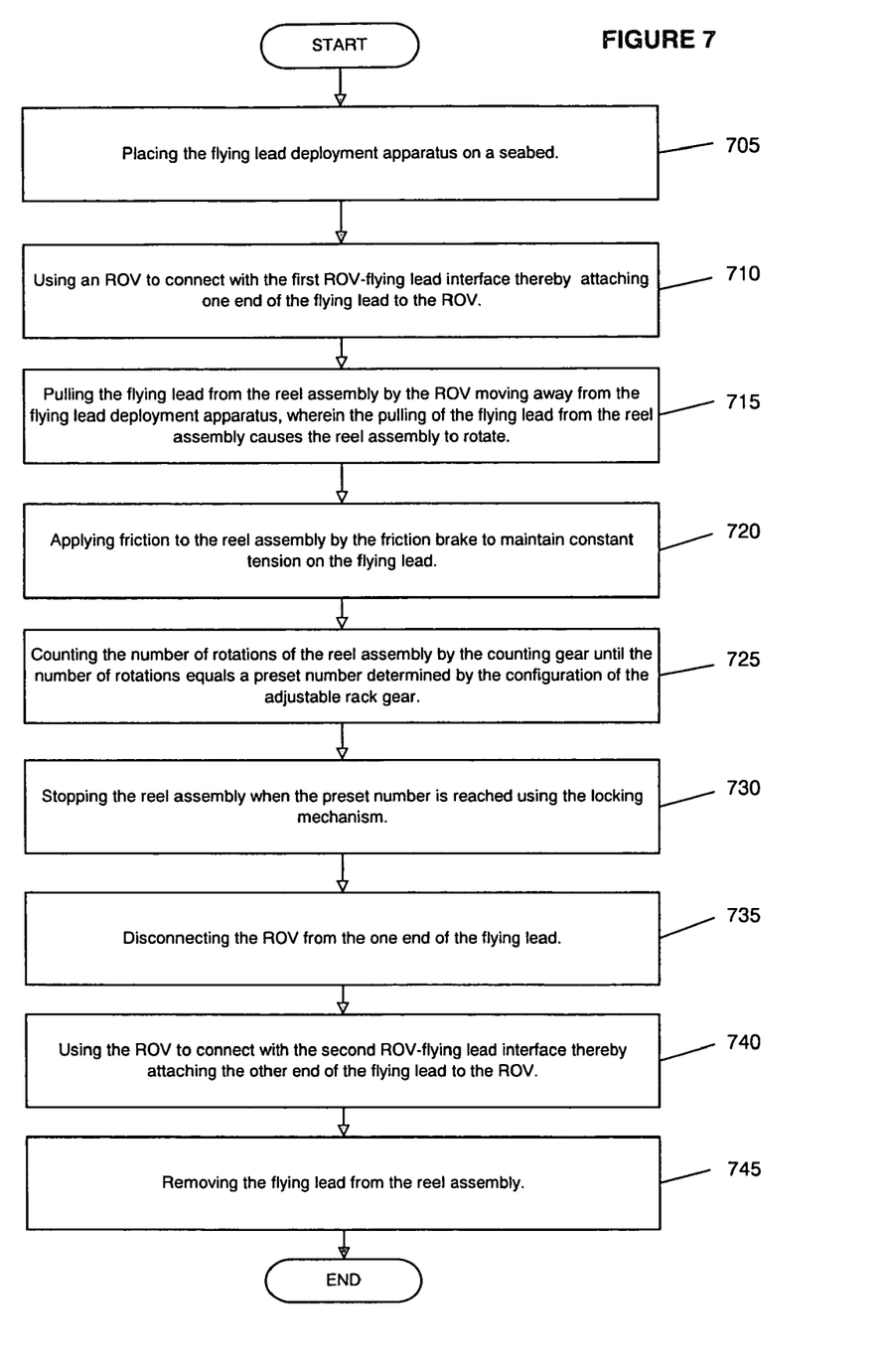
FIG. 7 is a schematic of the method for using a multiuse adjustable flying lead deployment system.

A remote operated vehicle (ROV) connects with the first ROV-flying lead interface and attaches to one end of the flying lead (710). The ROV, connected to the flying lead, then moves away from the reel assembly pulling the flying lead from the reel (715). As the flying lead is pulled from the reel, the reel assembly beings to rotate. In order to ensure that the reel assembly rotates at a constant rate, a friction brake applies friction to the reel assembly (720). By controlling the rate of the reel assembly, the friction brake also ensures that the flying lead is deployed with a constant tension.

As the reel assembly rotates, a counting gear in the drive assembly counts the number of rotations of the reel assembly makes (725). Once the counting gear reaches a predetermined number of rotations, the adjustable rack gear that is connected to the counting gear engages the locking mechanism. The locking mechanism stops the reel assembly from rotating (730).

The method continues by the ROV disconnecting from the flying lead (735) and then connecting to the second ROV-flying lead interface (740). By connecting to the second ROV-flying lead interface, the ROV is connected to the other end of the flying lead. The ROV then removes the flying lead from the reel assembly (745).

The method can entail the step of removing the flying lead deployment system from the seabed for future use. The flying lead deployment system is reusable in that once the flying lead has been removed from the reel assembly, the apparatus can either be loaded with more flying lead onto and same reel assembly or a new reel assembly can be interchanged onto the frame assembly.

While this method and apparatus have been described with emphasis on the preferred embodiments, it should be understood that within the scope of the appended claims, the method and apparatus might be practiced other than as specifically described herein.

What is claimed is:

1. A flying lead deployment apparatus with one reel assembly wherein the apparatus is adapted to be placed on a seabed, the apparatus comprising:
   a. a frame assembly;
   b. the reel assembly disposed in the frame assembly comprising flying lead, wherein the reel assembly is adapted to rotate to distribute the flying lead;
   c. a first ROV-flying lead interface connected to the frame assembly and one end of the flying lead;
   d. a second ROV-flying lead interface connected to the reel assembly and the other end of the flying lead;
   e. a drive assembly disposed in the frame assembly connected to the reel assembly, wherein the drive assembly comprises:
      i. a counting gear adapted to count the number of times the reel assembly rotates;
      ii. an adjustable rack gear connected to the counting gear; and
      iii. a locking mechanism connected to the adjustable rack gear and the reel assembly, wherein the locking mechanism is adapted to stop the reel assembly when the counting gear reaches a predetermined number; and f. a friction brake connected to the frame assembly and reel assembly, wherein the friction brake applies friction to the reel assembly in order to maintain constant tension on the flying lead.

2. The apparatus of claim 1, wherein the flying lead deployment apparatus is adapted to deploy up to 500 feet of flying lead.

3. The apparatus of claim 1, wherein the flying lead deployment apparatus further comprises a plurality of saddles attached to the frame assembly adapted to hold electrical flying leads.

4. The apparatus of claim 1, wherein the frame assembly comprises a base frame adapted to give support to the flying lead deployment apparatus.

5. The apparatus of claim 4, wherein the frame assembly further comprises a plurality of lifting eyes adapted to base frame adapted to give support to the flying lead deployment apparatus.

6. The apparatus of claim 4, wherein the frame assembly further comprises a plurality of folding wings connected to the base frame adapted to increase the area of the base frame when the apparatus is in use.

7. The apparatus of claim 1, wherein the reel assembly further comprises:
  a. a rotatable drum mounted on a shaft connected to the drive assembly;
  b. flying lead wound around the rotatable drum;
  c. an indexing plate connected to the rotatable drum;
  d. a lifting yoke connected to the indexing plate; and
  e. a counterweight assembly mounted within the rotatable drum.

8. The apparatus of claim 1, wherein the first ROV-flying lead interface and the second ROV-flying lead interface are non-moveable J-plates adapted to allow an ROV to dock with the interface.

9. The system of claim 1, wherein the drive assembly further comprises an ROV-reel assembly interface adapted to allow an ROV to drive the reel assembly.

10. A flying lead deployment apparatus with two reel assemblies wherein the apparatus is adapted to be placed on a seabed, the apparatus comprising:
  a. a frame assembly;
  b. a first reel assembly disposed in the frame assembly comprising first flying lead, wherein the reel assembly is adapted to rotate to distribute the first flying lead;
  C. a first ROV-flying lead interface connected to the frame assembly and one end of the first flying lead;
  d. a second ROV-flying lead interface connected to the reel assembly and the other end of the first flying end;
  e. a first drive assembly disposed in the frame assembly connected to the first reel assembly, wherein the first drive assembly comprises:
    i. a first counting gear adapted to count the number of times the first reel assembly rotates;
    ii. an first adjustable rack gear connected to the first counting gear; and
    iii. a first locking mechanism connected to the first adjustable rack gear and the first reel assembly, wherein the first locking mechanism is adapted to stop the first reel assembly when the first counting gear reaches a first predetermined number; and
  f. a first friction brake connected to the frame assembly and the first reel assembly, wherein the first friction brake is adapted to apply friction to the first reel assembly in order to maintain constant tension on the first flying lead;
  g. a second reel assembly disposed in the frame assembly comprising second flying lead, wherein the second reel assembly is adapted to rotate to distribute the second flying lead, and wherein the second reel assembly rotates separate from the first reel assembly;
  h. a third ROV-flying lead interface connected to the frame assembly and one end of the second flying lead;
  i. a fourth ROV-flying lead interface connected to the second reel assembly and the other end of the second flying end;
  j. a second drive assembly disposed in the frame assembly connected to the second reel assembly, wherein the second drive assembly comprises:
    i. a second counting gear adapted to count the number of times the second reel assembly rotates;
    ii. a second adjustable rack gear connected to the second counting gear; and
    iii. a second locking mechanism connected to the second adjustable rack gear and the second reel assembly, wherein the second locking mechanism is adapted to stop the second reel assembly when the second counting gear reaches a second predetermined number; and
  k. a second friction brake connected to the frame assembly and the second reel assembly, wherein the second friction brake is adapted to apply friction to the second reel assembly in order to maintain constant tension on the second flying lead.

11. The apparatus of claim 10, wherein the flying lead deployment apparatus is adapted to deploy up to 500 feet of flying lead.

12. The apparatus of claim 10, wherein the flying lead deployment apparatus further comprises a plurality of saddles attached to the frame assembly adapted to hold electrical flying leads.

13. The apparatus of claim 10, wherein the frame assembly comprises a base frame adapted to give support to the flying lead deployment apparatus.

14. The apparatus of claim 13, wherein the frame assembly further comprises a plurality of lifting eyes adapted to base frame adapted to give support to the flying lead deployment apparatus.

15. The apparatus of claim 13, wherein the frame assembly further comprises a plurality of folding wings connected to the base frame adapted to increase the area of the base frame when the apparatus is in use.

16. The apparatus of claim 10, wherein the reel assembly further comprises:
  a. a rotatable drum mounted on a shaft connected to the drive assembly;
  b. flying lead wound around the rotatable drum;
  c. an indexing plate connected to the rotatable drum;
  d. a lifting yoke connected to the indexing plate; and
  e. a counterweight assembly mounted within the rotatable drum.

17. The apparatus of claim 10, wherein the first ROV-flying lead interface and the second ROV-flying lead interface are non-moveable J-plates adapted to allow an ROV to dock with the interface.

18. The system of claim 10, wherein the drive assembly further comprises an ROV-reel assembly interface adapted to allow an ROV to drive the reel assembly.

19. A method for using flying lead deployment apparatus with one reel assembly comprising the steps of:
   a. placing the flying lead deployment apparatus on a seabed, wherein the flying lead deployment apparatus comprises:
      i. a frame assembly;
      ii. the reel assembly disposed in the frame assembly comprising flying lead, wherein the reel assembly is adapted to rotate to distribute the flying lead;
      iii. a first ROV-flying lead interface connected to the frame assembly and one end of the flying lead;
      iv. a second ROV-flying lead interface connected to the reel assembly and the other end of the flying end;
      v. a drive assembly disposed in the frame assembly connected to the reel assembly, wherein the drive assembly comprises:
         1. a counting gear adapted to count the number of times the reel assembly rotates;
         2. an adjustable rack gear connected to the counting gear; and
         3. a locking mechanism connected to the adjustable rack gear and the reel assembly adapted to stop the reel assembly; and
      vi. a friction brake connected to the frame assembly and the reel assembly adapted to apply friction to maintain constant tension on the flying lead;
   b. using an ROV to connect with the first ROV-flying lead interface thereby attaching one end of the flying lead to the ROV;
   c. pulling the flying lead from the reel assembly by the ROV moving away from the flying lead deployment apparatus, wherein the pulling of the flying lead from the reel assembly causes the reel assembly to rotate;
   d. applying friction to the reel assembly by the friction brake to maintain constant tension on the flying lead;
   e. counting the number of rotations of the reel assembly by the counting gear until the number of rotations equals a preset number determined by the configuration of the adjustable rack gear;
   f. stopping the reel assembly when the preset number is reached using the locking mechanism;
   g. disconnecting the ROV from the one end of the flying lead;
   h. using the ROV to connect with the second ROV-flying lead interface thereby attaching the other end of the flying lead to the ROV; and
   i. removing the flying lead from the reel assembly.

20. The method of claim 19, further comprising the step of removing the flying lead deployment apparatus from the seabed.

* * * * *